Aug. 24, 1965 E. W. GLIDDEN ETAL 3,201,822
REMOVAL OF MEAT FROM SEPARATED SECTIONS
OF THE LEGS OF KING CRAB
Filed Oct. 1, 1963 2 Sheets-Sheet 1
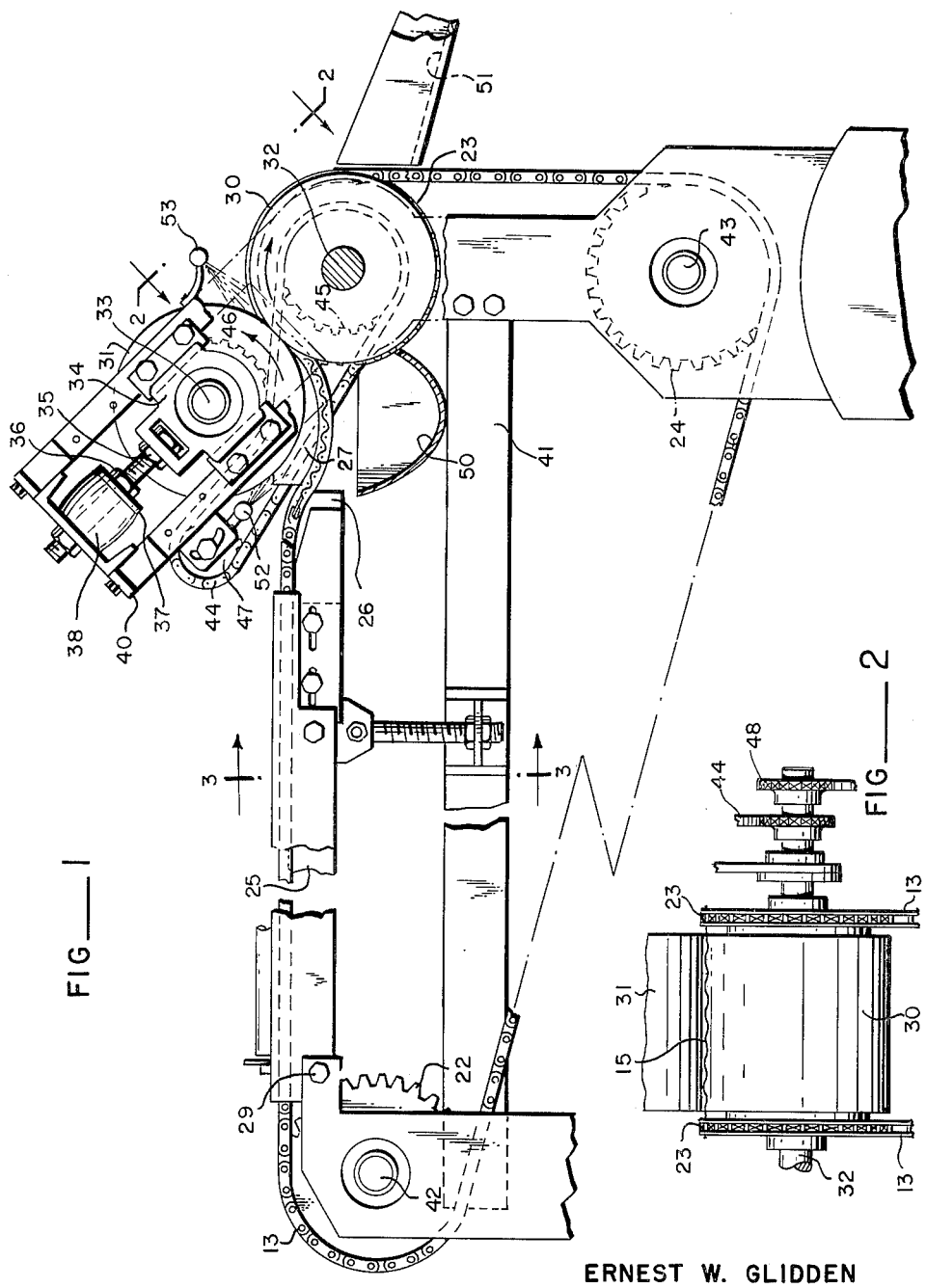
ERNEST W. GLIDDEN
LLOYD C. FREDRICKSON
INVENTORS
BY Seed & Berry
ATTORNEYS Aug. 24, 1965
E. W. GLIDDEN ETAL
3,201,822
REMOVAL OF MEAT FROM SEPARATED SECTIONS
OF THE LEGS OF KING CRAB
Filed Oct. 1, 1963
2 Sheets-Sheet 2
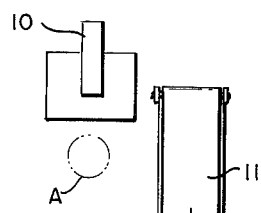
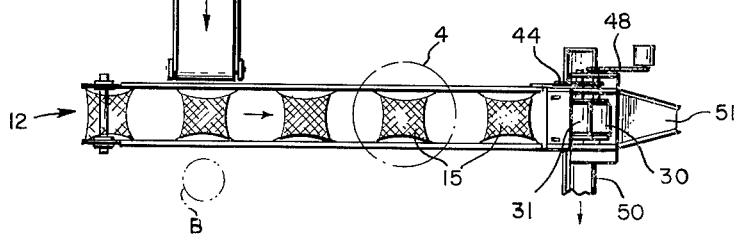
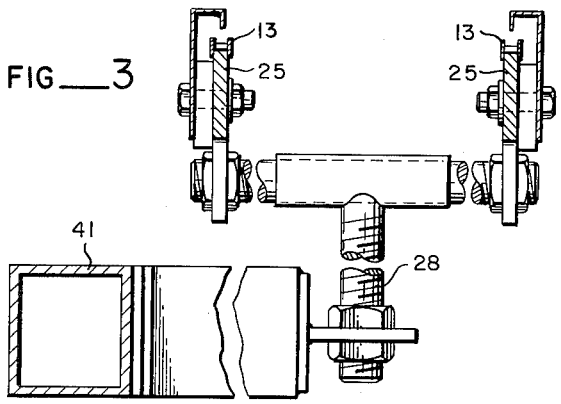
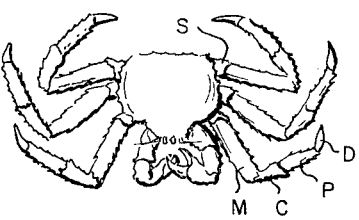
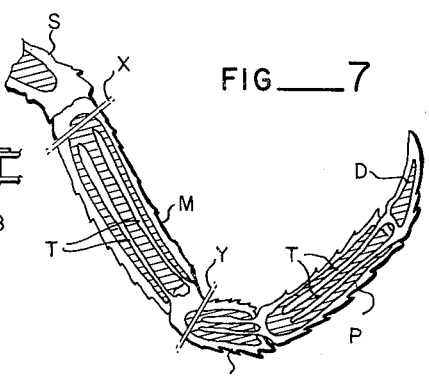
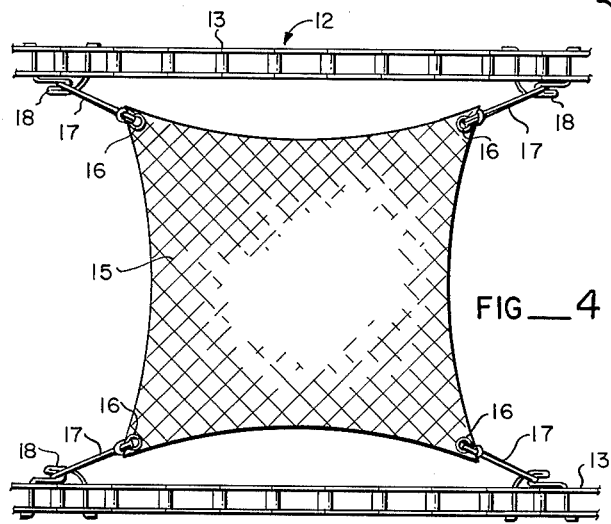
ERNEST W. GLIDDEN
LLOYD C. FREDRICKSON
INVENTORS
BY *Seed & Berry*
ATTORNEYS United States Patent Office 3,201,822
Patented Aug. 24, 1965

3,201,822
REMOVAL OF MEAT FROM SEPARATED SEC-
TIONS OF THE LEGS OF KING CRAB
Ernest W. Glidden, Seattle, and Lloyd C. Frederickson,
Bellingham, Wash., assignors to Wakefield Seafoods,
Inc., Seattle, Wash., a corporation of Washington
Filed Oct. 1, 1963, Ser. No. 313,011
16 Claims. (Cl. 17—2)

This invention relates to the removal of meat from the legs of king crab.

A general object is to provide a perfected machine for this purpose of the type in which the legs are fed into the nip, i.e., the entry side, of a pair of touching resiliently-faced live rolls so as to expel the meat by squeeze pressure exerted from the rolls. A more particular object is to devise a roll-type machine which will effectively handle separated sections of the legs. It is a yet further object to provide a machine of this character having a conveyor of perfected design to feed the leg sections into the nip of the rolls, permitting an operator, whose duty it is to feed the machine, to occupy a station remote to the rolls and by such token eliminate the hazard which exists when it is necessary to insert the leg sections by hand directly into the nip.

The invention has the still further and important object of devising a machine to carry out the method of removing meat from sections of crab leg unique in the sense that the separation of the leg into sections is accomplished by saw-cuts so precisely placed that the meat later expelled by squeeze pressure from the rolls is subjected to the least possible frictional resistance in course of being pushed from the shell, and is free of tendon particles.

These and other objects and advantages of the invention will appear and be understood in the course of the following description and claims, the invention consisting in the novel construction, adaptation and combination of the parts of a machine for practicing the pressure method for expelling crab meat, hereinafter described and claimed.

In the accompanying drawings:

FIGURE 1 is a fragmentary side elevational view illustrating that part of the machine which includes the feed conveyor and the pressure rolls.

FIG. 2 is a fragmentary end elevation of the machine viewed from the vantage point shown at 2—2 of FIG. 1.

FIG. 3 is a fragmentary transverse vertical sectional view drawn on an enlarged scale on line 3—3 of FIG. 1.

FIG. 4 is an enlarged-scale top plan view of a fragmentary part of the feed conveyor.

FIG. 5 is a fragmentary schematic plan view of the machine including a showing of the cutting table where the saw-cuts are made.

FIG. 6 is a top plan view of a king crab; and

FIG. 7 is a schematic illustration of one of the legs thereof to permit application of identifying letters to the several articulating sections thereof and a broken-line portrayal of the locations at which saw-cuts are made.

Where meat is to be extracted from the legs and claws of a king crab, these appendages are stripped from the body proper and are cooked and then chilled. A preferred cooking procedure is described in our copending application for Letters Patent of the United States filed Nov. 3, 1961, Ser. No. 150,036. Considered from the inner end toward the tip, such legs are comprised of a shoulder piece S, merus M, carpus C, propodus P, and dactylus D. Cartilage capable of being rather easily ruptured separates these several sections at the joints. Tendons T are rooted to such cartilage at the outer end of each section and extend longitudinally therefrom through the contained meat, reaching to approximately the inner extreme of the concerned section. The three outermost sections, namely the dactylus D, the propodus P, and the carpus C normally assume more or less of an in-line relationship. The carpus C and the merus M tend to assume a rather sharp angular relationship approaching that indicated in FIG. 6. The merus and the shoulder piece S also normally assume an angular relationship, albeit less sharp.

Heretofore, the best results in removing meat from the legs of the king crab have been obtained where whole legs are fed, tip end first, into the nip of a pair of power-driven resiliently-surfaced pressure rolls, employing the progressing compression pressure of the rolls to squeeze the meat from the propodus section through the carpus section against the meat contained in the merus section. This endwise force loosens the merus meat which is in turn pressed against the meat contained in the shoulder. The successively loosened meat chunks, namely propodus meat, carpus meat, merus meat, and shoulder meat issue in inverse order from the open back end of the shoulder piece. The object has been to effectuate a dislodgment of the meat chunks by the endwise pressure passed from the meat of one section to the meat of the adjoining section, rather than from direct compressive pressure of the rolls, so as to keep the meat from becoming crushed, but in order to attain this end it becomes essential that there be a modicum of interference, by friction for example, to a free travel of the expelled meat through the leg sections and past the joints. The above-mentioned normal angular relationship between the carpus and merus sections, and between the merus and shoulder sections, creates excessive resistance. Our above-identified pending application is directed to a machine and method intended, among other objects, to minimize this angle. This machine and method has proven itself to be a marked improvement over previously existing practices but falls short of being the complete answer in that some of the meat recovered has been in a shredded form, marketable only at a considerably lesser figure than chunk meat. A partial reason for the shredding lies in the fact that the angularity between adjoining leg sections is not the entire problem. There also exists at the two upper joints of the leg valve-like appendages which swing like a hinged door into an obstructive position as the related adjoining sections bend from one another into an angularity less than 30°, approximately. If the angle is diminished below 30° the appendage creates an obstruction. A travel path elbowed to an angle much greater than 30° creates undue frictional resistance. Leaving little leeway, therefore, in the elbow angles which are to be prescribed for the crab legs as they are fed between pressure rolls, control of this angle becomes quite difficult when the size of the legs being processed through a single machine varies to any appreciable extent.

We find that one answer to the above problem is to cut the legs into three separated sections with the lines of cut $x$ and $y$ (FIG. 7) so placed as to eliminate traversal of the valved elbows. An advanced mode of conveying the separated sections to and between pressure rollers permits the augmented number of pieces to be fed with utmost accuracy and with greater expedition than the previous manually inserted whole leg. The cuts $x$ and $y$ are desirably performed by a band saw 10 as a steep preliminary to placing the pieces upon the conveyor.

In the drawings two operator's stations are circled by the letters A and B. It is the function of the operator who occupies station A to make the saw-cuts upon the crab legs. The cut sections of crab leg are placed from the saw table upon the horizontal upper run of an endless conveyor belt 11, hereinafter termed the supply conveyor. Station B lies at the tail end of the supply conveyor. The operator occupying station B removes the leg sections from such supply conveyor and transfers same to the horizontal upper run of a second endless conveyor 12 hereinafter termed the feed conveyor. In this transfer the leg sections are so placed upon the feed conveyor that the leg section generally parallels the longitudinal median line of the conveyor, with the back end of the leg section (i.e. the end most proximal to the root) facing to the rear. The longitudinal median lines of the two conveyors are disposed normal to one another as a convenience to the operator occupying station B.

Along each of its two sides the conveyor 12 has a respective chain 13, and stretch between these chains to occupy positions at equidistantly spaced intervals of the conveyor's length are mesh flights 15, or hammocks as they will be hereinafter termed. Generally square in plan configuration, these hamocks have grommets 16 in each of the four corners from which diagonal rubber bands 17 extend to hooks 18 which are carried by the chains. The hammocks are flexible and desirably comprise a foraminous core—expanded paper is especially suitable—with a coating of elastic rubber, and the diamond-shaped interstices of the hammock are moderately large, say ¼". The hammocks have a length approximating the length of the longest leg sections which are to be carried thereby, and the spaces between the hammocks are or may be moderately longer.

To prescribe the travel path of said feed conveyor the chains are trained about three sets of sprockets wheels 22, 23 and 24. Sprocket wheels 22 and 23 lie at the head and tail ends, respectively, of the conveyor's upper run, and in its progression along said upper run the chains are constrained to travel along an established path by means of a series of guide rails 25, 26 and 27. These guide rails are provided along each of the two sides of the conveyor. Guide 25 occupies a generally horizontal plane and extends for the greater part of the run with its front end sustained by a jack-screw 28 for minor vertical adjustment about a rear pivot 29. Guide 26 extends forwardly as a prolongation of the guide 25, is carried for endwise adjustment relative thereto, and has its outer end curved downwardly. The concerned chain, right or left side as the case may be, rides over the guide rails 25 and 26 and under the guide rail 27, with such latter rail being carried by stanchions (giving support to the spindle 33) and having a curved configuration initially continuing the downward curve of the guide 26 and thence bending upwardly on a merging arc developed tangent to the sprocket wheels 23 about a center occupying a projected line radial to the axis of such wheels 23 and biased toward said guided portion of the conveyor's travel path approximately 45° from the vertical.

The two resiliently faced companion rolls which exert squeeze pressure upon crab leg sections carried by the feed conveyor are designated by 30 and 31. Roller 30 occupies the space between the two sprocket wheels 23, has a diameter corresponding to that of the sprocket wheels, and is fast to a common live spindle 32 so as to turn in unison with the sprocket wheels. Squeeze roller 31 has a similar diameter and is fixed to a live spindle 33 of opposite rotation journaled for rotation about an axis lying parallel to that of the spindle 32 on said radially projected line to which the guide 27 is tangent. The nip of the rolls thus faces toward the rear end of the fed conveyor and coincides with the tail extremity of such guide rails 27.

The journel mounting for the spindle 33 is comprised of boxes 34 mounted for slide motion toward and from the spindle 32. The boxes are given a yielding setting by bolts 35 and adjusting nuts 36, the nuts bearing against thrust washers 37 which bear in turn upon blocks 38 composed of elastic rubber or other like or suitable resilient material.

Stanchions 40 rigid with the frame-work 41 which gives support to the spindle 32 and to the shafts 42 and 43 for the two sets of sprocket wheels 22 and 24, respectively serve as mountings for the ways on which the boxes 34 slide. An endless chain 44 is trained from a sprocket wheel 45, fast to the spindle 32, over a sprocket wheel 46 fast to the spindle 33 and thence about an adjustably mounted tensioning wheel 47.

An electric motor acts through a chain 48 to drive the spindle 32.

Water from perforated manifold pipes 52 and 53 is constantly sprayed on the surfaces of the two squeeze rollers.

As leading ends of the conveyed crab leg sections reach the nip of the rolls the sections become squeezed and force the meat from the trailing end. Such meat is in unbroken chunks substantially free of shreds and drops off the after edge of the concerned hammock, falling into a transversely sloped receiving trough 50 which underlies the squeeze zone. The trough leads laterally to a meat-handling station. The empty crushed crab sheels pass between the squeeze rolls and are deposited upon an apron 51 which leads to a refuse conveyor.

It is thought that the invention will have been clearly understood from the foregoing detailed description. It is our intention that no limitations be implied and that the hereto annexed claims be given the broadest interpretation to which the employed language fairly admits.

What I claim is:

1. A machine for extracting meat from a king crab leg which has been severed from the body of the crab, comprising: a pair of complementing live pressure rollers so located and driven in counter directions of rotation as to produce an infeed throat leading to a nip, and an endless driven conveyor providing hammocks spaced apart at intervals of the length of the conveyor to serve as work-supporting flights, the conveyor being trained so that a run thereof travels a prescribed path having no more than a moderate slope and at the tail end of which the hammocks pass between the rollers entering at the nip of the latter, the hammocks in their travel along said path locating the upper surface thereof approximately parallel with the path, the hammocks being adapted to sustain the crab legs thereon with the large ends facing to the rear and being flexible with said upper surface providing frictional resistance to relative motion of said sustained legs in a direction endwise to their length as the legs travel with the conveyor.

2. A machine according to claim 1 in which the hammocks are mesh with the openings moderately large.

3. A machine according to claim 1 in which the hammocks are comprised of expanded paper having a rubber-like elastic coating.

4. A machine according to claim 1 in which the rollers are faced with resilient rubber, and having means yieldingly pressing at least one of said rollers directively toward the other.

5. A machine according to claim 1 in which the rotary axes of the pressure rollers occupy a plane biased toward the nip side a substantial degree from the vertical.

6. A machine according to claim 5 in which the hammocks are strung between a pair of laterally spaced complementing chains, and wherein means are provided guiding the chains to establish said prescribed path, said path of the hommocks being approximately horizontal throughout the major portion of their conveying travel and upon approaching the rollers becoming approximately tangent to the nip of the latter.

7. A machine according to claim 1, the rollers being so placed that the nip faces downwardly, and wherein the travel path of the hammocks in their immediate approach to the nip of the rollers is approximately tangent to the rollers at their nip point.

8. Structure as recited in claim 1 in which the nip faces downwardly in a plane biased approximately 45° from the vertical.

9. A machine according to claim 1, the two rollers being located one above the other, the travel path of the hammocks as the latter issue from between the rollers being over the top of the lower roller and thence downwardly in a steeply inclined plane tangent to such lower roller.

10. A machine for extracting meat from a king crab leg which has been severed from the body of the crab, comprising: a pair of complementing pressure rollers so located and driven in counter directions of rotation as to produce an infeed throat leading to a nip, an endless driven conveyor comprising a respective endless driven chain extending along each of the two side edges thereof and having flexible mesh hammocks strung as work-supporting flights between said chains at spaced intervals of the length, each side edge of each hammock being attached at each of its two ends to the related chain, and means prescribing for said chains a run which carries the hammocks along a path which has no more than a moderate slope and leads to the infeed throat and said nip.

11. The machine of claim 10 in which the hammock is comprised of a rectangular sheet of expanded paper having the paper entirely coated with a substance impervious to water and producing a friction surface.

12. A machine according to claim 11 in which the coating substance is rubber-like with moderate elasticity.

13. Structure according to claim 10, side edges of the hammocks being attached to the chains by elastic cords drawing the hammocks tightly between the chains.

14. A machine for extracting meat from a king crab leg which has been severed from the body of the crab, comprising: a pair of complementary pressure rollers so located and driven in counter directions of rotation as to produce an infeed throat leading to a nip, an endless driven conveyor trained to have an upper run thereof pass between the rollers entering by said infeed throat to the nip of the rollers and formed to present a succession of lands adapted to support the crab legs upon the upper surface thereof with the large ends facing to the rear and having said lands separated by openings of a size permitting meat extracted from conveyed crab legs by squeeze pressure of the rollers to fall freely therethrough, said upper surface of the lands providing frictional resistance to relative motion of said supported legs in a direction endwise to their length as the legs travel with the conveyor, thus to counter kickback forces which as a consequence of the narrowing of the infeed throat as the surfaces of the rollers progress toward the nip are imposed by the rollers upon the conveyed crab legs entering said infeed throat.

15. A machine according to claim 14 in which the lands are comprised of expanded paper coated with a rubber-like substance.

16. A machine according to claim 14 in which the two rollers are so mounted that a plane occupied by the nip lying median to the infeed throat slopes upwardly toward the nip, the travel path of the conveyor approximately coinciding with said sloping plane as said path traverses the infeed throat.

References Cited by the Examiner
UNITED STATES PATENTS

| | | | |
|---|---|---|---|
| 1,914,708 | 6/33 | Baden | 198—153 |
| 2,660,754 | 12/53 | Roshko | 17—2 |
| 2,828,002 | 3/58 | Sawrie | 198—153 |
| 2,978,334 | 4/61 | Lapeyre | 99—111 |
| 2,987,759 | 6/61 | Lapeyre et al. | 17—2 |
| 3,022,175 | 2/62 | Wakefield | 99—111 |

SAMUEL KOREN, *Primary Examiner.*
LUCIE H. LAUDENSLAGER, *Examiner.*